(12) United States Patent
de Frutos

(10) Patent No.: US 6,906,487 B2
(45) Date of Patent: Jun. 14, 2005

(54) ANTI-PINCH WINDOW DRIVE CIRCUIT

(75) Inventor: Xavier de Frutos, Venelles (FR)

(73) Assignee: International Rectifier Corporation, El Segundo, CA (US)

( * ) Notice: Subject to any disclaimer, the term of this patent is extended or adjusted under 35 U.S.C. 154(b) by 46 days.

(21) Appl. No.: 10/348,682

(22) Filed: Jan. 21, 2003

(65) Prior Publication Data

US 2003/0137265 A1 Jul. 24, 2003

Related U.S. Application Data

(60) Provisional application No. 60/350,192, filed on Jan. 21, 2002.

(51) Int. Cl.[7] .............................. G05D 3/00; H02P 3/00; H02P 7/00
(52) U.S. Cl. ........................ 318/468; 318/280; 318/283; 318/286; 318/461; 318/466; 318/469; 49/26; 49/28; 49/30
(58) Field of Search ................................ 318/430–467, 318/280, 283, 266, 286, 468; 49/28–30

(56) References Cited

U.S. PATENT DOCUMENTS

| | | | | |
|---|---|---|---|---|
| 4,675,586 A | * | 6/1987 | Eigner et al. | 318/458 |
| 4,749,924 A | * | 6/1988 | Watanabe et al. | 318/474 |
| 4,870,333 A | * | 9/1989 | Itoh et al. | 318/286 |
| 4,900,994 A | * | 2/1990 | Mizuta | 318/283 |
| 5,453,669 A | * | 9/1995 | Nishibe et al. | 318/434 |
| 5,596,253 A | * | 1/1997 | Mizuta et al. | 318/469 |
| 5,610,484 A | * | 3/1997 | Georgin | 318/286 |
| 5,701,063 A | * | 12/1997 | Cook et al. | 318/469 |
| 5,714,854 A | * | 2/1998 | Mizuta et al. | 318/266 |
| 5,723,960 A | * | 3/1998 | Harada | 318/469 |
| 5,729,104 A | * | 3/1998 | Kamishima et al. | 318/446 |
| 5,743,245 A | * | 4/1998 | Mizek | 124/44.5 |
| 5,754,017 A | * | 5/1998 | Tsuge et al. | 318/286 |
| 5,838,126 A | * | 11/1998 | Llerena | 318/286 |
| 5,949,207 A | * | 9/1999 | Luebke et al. | 318/446 |
| 5,966,071 A | * | 10/1999 | Tsuge et al. | 340/438 |
| 6,034,497 A | * | 3/2000 | Tamagawa et al. | 318/466 |
| 6,051,945 A | * | 4/2000 | Furukawa | 318/280 |
| 6,054,822 A | * | 4/2000 | Harada | 318/434 |
| 6,548,972 B2 | * | 4/2003 | Takagi | 318/293 |
| 6,806,664 B2 | * | 10/2004 | Beishline | 318/280 |

* cited by examiner

Primary Examiner—David Martin
Assistant Examiner—Tyrone Smith
(74) Attorney, Agent, or Firm—Ostronlenk, Faber, Gerb & Soffen, LLP

(57) ABSTRACT

An antipinch circuit prevents the motor driven closure of an automotive window if a soft obstacle is compressed between the window and the top of the door frame, and the window is opened in response to the sensing of the obstacle. The circuit measures the motor torque (by measuring motor current) and the motor shaft speed (by measuring motor back EMF). The torque and motor speed are compared to "signatures" of these values in the case of the window closing normally against the top of the door frame, or against an obstacle, and either stopping or reversing the motor rotation accordingly.

17 Claims, 6 Drawing Sheets

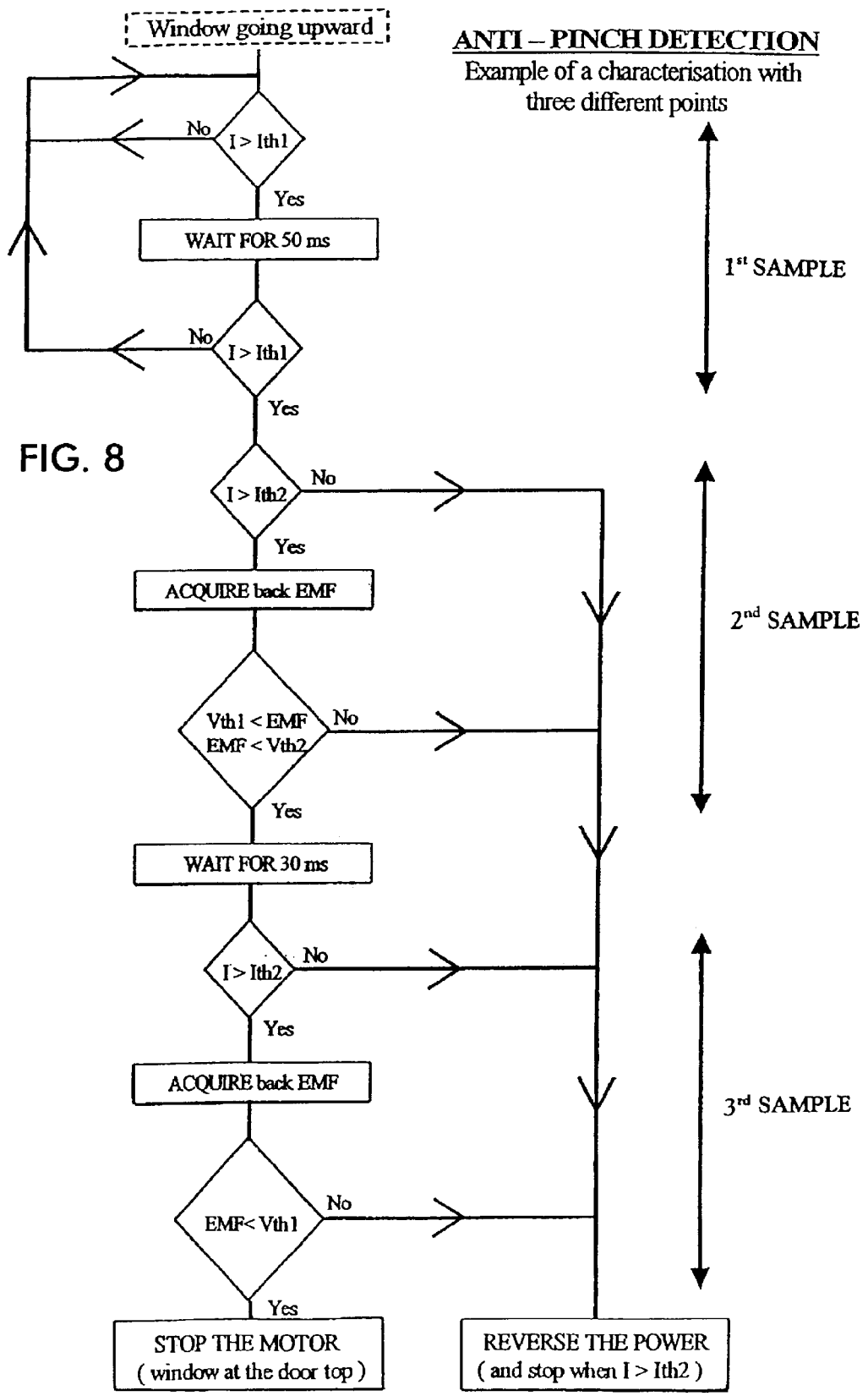

ANTI-PINCH WINDOW DRIVE CIRCUIT

RELATED APPLICATIONS

This application claims the benefit of U.S. Provisional Application No. 60/350,192, filed Jan. 21, 2002.

FIELD OF THE INVENTION

This invention relates to control circuits and more specifically relates to a novel anti-pinch circuit for sensing obstacles in an automotive window path.

BACKGROUND OF THE INVENTION

Motor driven automotive windows should stop while closing if an obstacle (such as a person's hand or finger or the like) is pressed between the top of the window and the top of the window frame. Mechanical sensors (transducers) can be used for this purpose but these increase the number of parts needed and increase the cost of the window control system. The use of added parts also reduces the reliability of the system.

It would be desirable to eliminate the need for such sensor transducers in an anti pinch control system.

BRIEF DESCRIPTION OF THE INVENTION

In accordance with the invention, the motor current (of a d-c motor in an H bridge control circuit) is monitored and the distortion in the motor current wave shape due to an obstacle in the window path when closing is monitored to stop the motor. The sensing circuit can be integrated into an IC control chip, such as the IR3220 chip of the International Rectifier Corporation. This circuit is shown in copending application Ser. No. 10/091,194, filed Mar. 4, 2002 entitled H-BRIDGE WITH SINGLE LEAD FRAME (IR-1853), which is incorporated by reference in this application.

BRIEF DESCRIPTION OF THE DRAWINGS

FIG. 8 is a flow chart showing how the door top signature is identified.

BRIEF DESCRIPTION OF THE PREFERRED EMBODIMENTS

The present invention offers to automotive power window manufacturers a "full silicon" platform for an integrated low cost anti pinch solution without external sensors.

Figure 2:
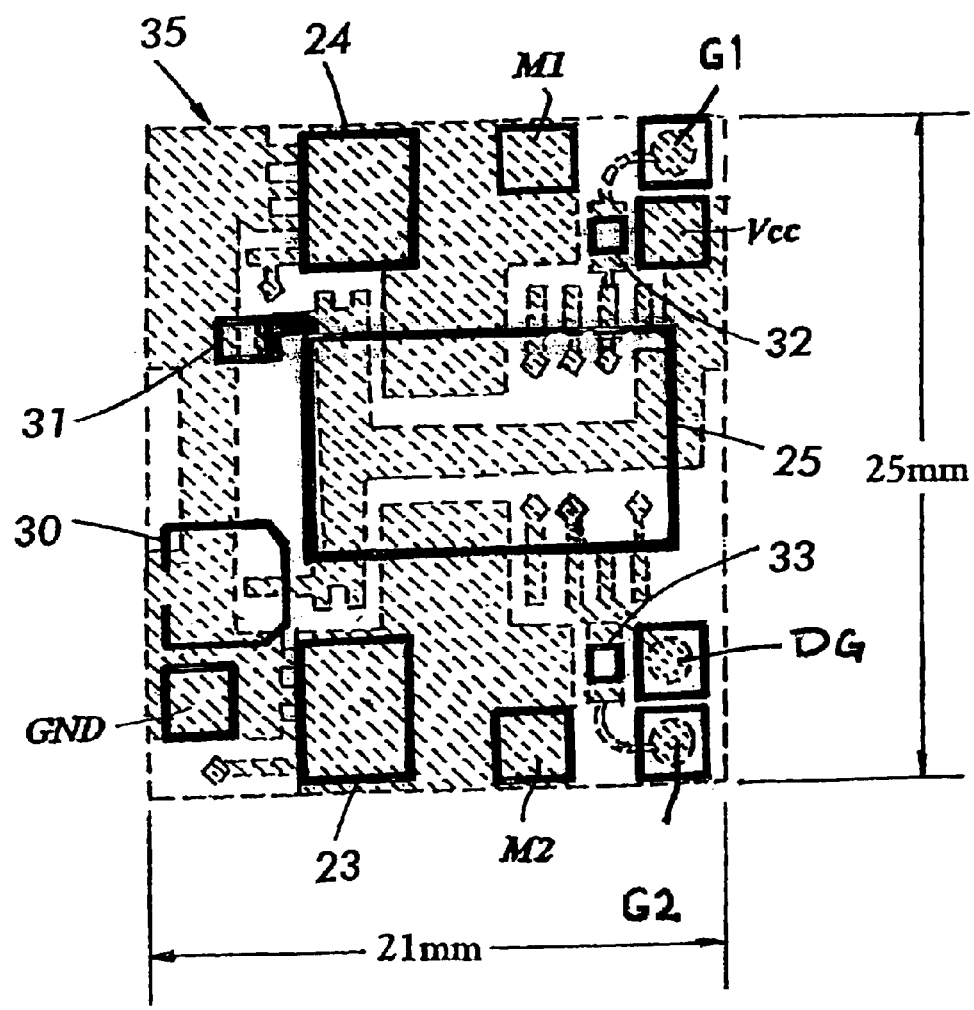
FIG. 2 is a top view of a circuit board for the d-c motor control.
Figure 3:
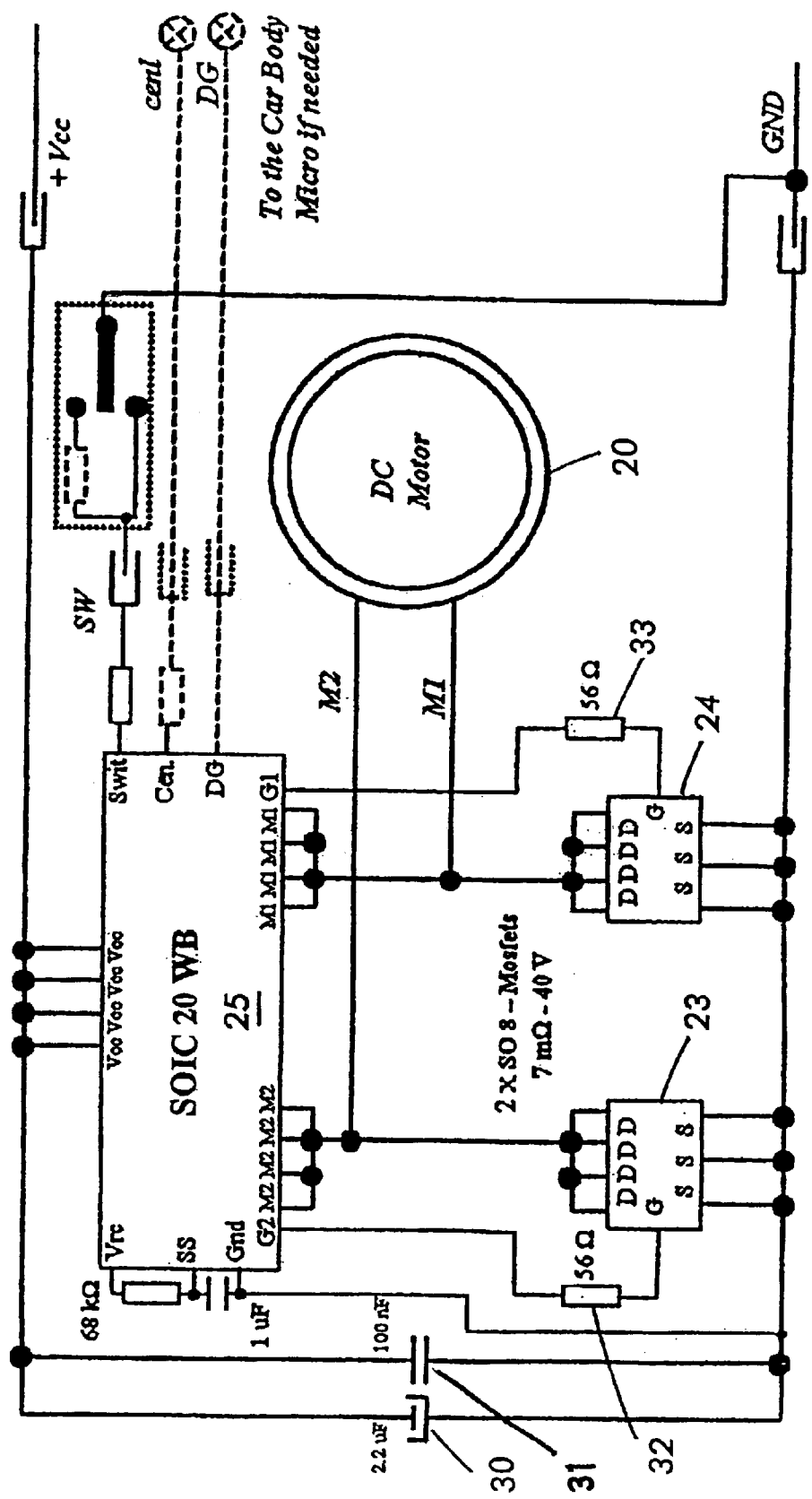
FIG. 3 is a block diagram of the components of FIGS. 1 and 2.

Referring first to FIG. 3, the overall circuit of the invention is shown for the anti pinch control of d-c motor 20 which is connected to drive a window within automotive door frame. The inputs M1 and M2 to the motor 20 are the terminals between high side MOSFETs 21 and 22 (FIG. 1) and low side MOSFETs 23 and 24 (FIGS. 2 and 3). MOSFETs 21 and 22 are integrated into IC 25 (FIG. 1) which has the general structure of the integrated H Bridge chip of copending application Ser. No. 10/091,194 (ER-1853) which is modified, as will be described hereinafter to contain the control functions of the invention. The low side MOSFETs 23 and 24 may be discrete 40 volt, 7 mohm MOSFETs in an SO8 package.

Capacitors 30 and 31 are input capacitors connected across the input terminals $+V_{cc}$ and GND of the automotive system. Resistors 32 and 33 are connected in the gate circuits of MOSFETs 23 and 24 respectively.

Figure 1:
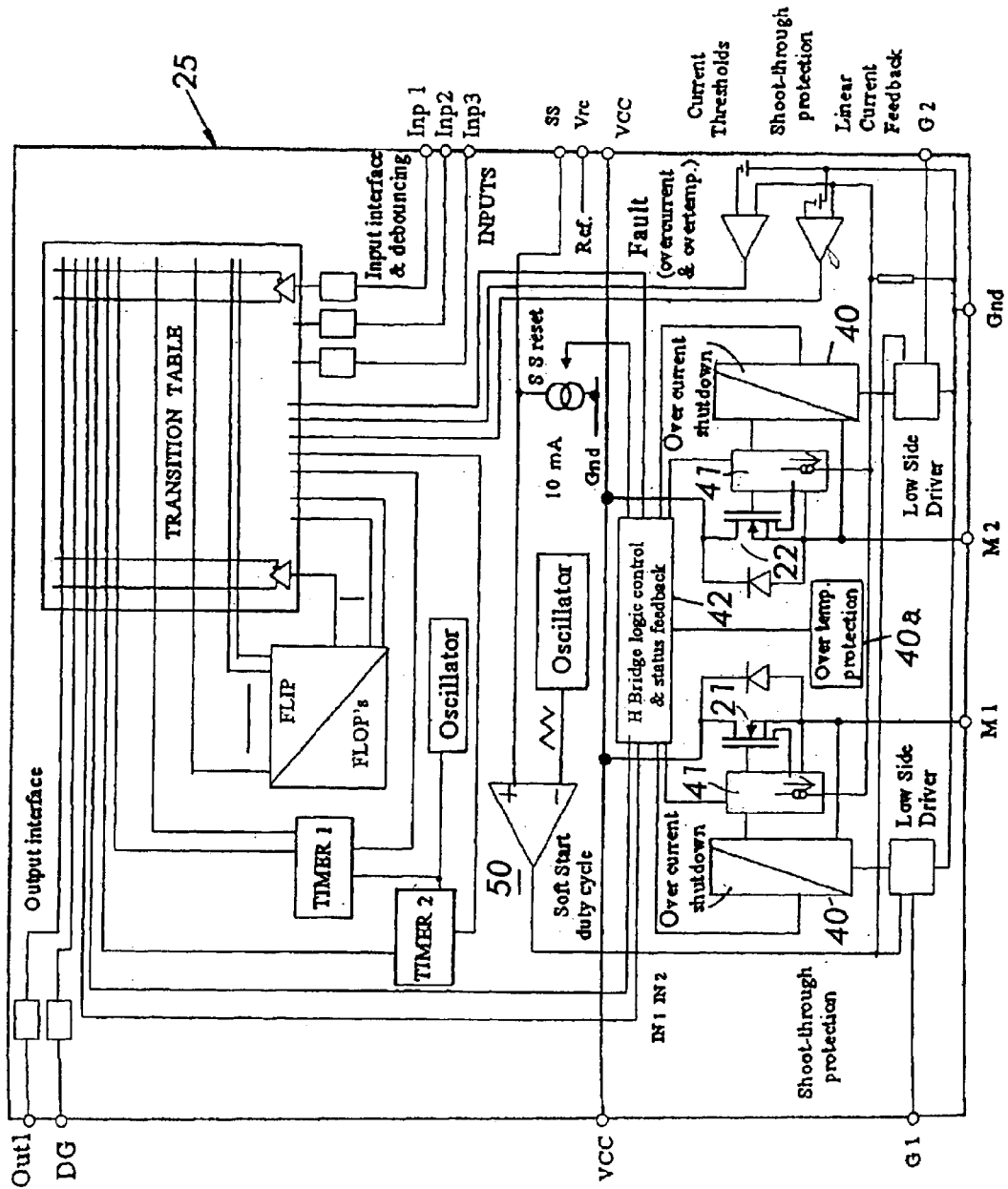
FIG. 1 is a block diagram of the architecture of an integrated circuit chip which can incorporate the invention.

The components of the system of FIGS. 1 and 3 may be mounted on a common circuit board 35 as shown in FIG. 2. Board 35 may be a thin FR4 type printed circuit board or the like and may have a width of about 21 mm as shown in FIG. 2. This assembly can be conveniently mounted in the chassis of d-c motor 20 or in any other desired way.

With the two additional regular MOSFETS, 23 and 24 the circuit drives DC motor in either of two directions and features over-current and over temperature protection circuits 40 and 40a (FIG. 1). Other relevant circuit blocks include High Side Current sensing circuits 41 and a Programmable Logic Array (P.L.A.) 42. The "H bridge I.C." 25 is able to house at the same time a P.L.A. 42 and Current Sensing High Side Switches 21, 22 so that all the basic blocks for the Anti-pinch function are integrated in a single part. FIG. 1 shows the typical architecture for device 25.

The architecture of IC 25 of FIG. 1 includes:

(a) embedded short-circuit protection circuits 40;

(b) overload protection by sensing the junction temperature at function block 40a;

(c) the inner 20 kHz PWM Soft Start circuit 50 which provides a sequence which avoids the inrush current of the motor;

(d) the High Side Current Sensing switches 21 and 22 offer the benefit of a direct and simple feedback of the motor current. Each direction is sensed in a single feedback circuit and the signal includes the freewheeling step;

(e) the speed of the motor is evaluated by "sampling on request" the back EMF of the motor;

(f) PWM circuitry offers the capability of controlling either the speed or the torque of the motor;

(g) The P.L.A. allows the I.C. 42 to become "intelligent" by supporting the State Machine of the whole anti-pinch function.

The Sensorless Detection

The sensorless detection goal of the invention is to identify different mechanical stops among several possibilities (the top of the door, an arm or a finger . . . etc.). Each has a defined and unique "Torque/Speed vs Time" characteristic when used as a mechanical stop in a power window. A simple and accurate way to differentiate each characteristic consists in sampling "specific points" of the Torque/Time or Speed/Time profiles when the window encounters an obstacle as will be described. When the profile "sampled" doesn't correspond to the "Top of the door" model then the window is immediately powered downward in order to release the obstacle.

Torque measurement can be done by the inner current sensing High Side Switch (Swit). A 100 kHz bandwidth and the 5% precision of the current feedback available with the IC 25 are good enough for the torque evaluation even while switching at 20 kHz.

The shaft speed of Motor 20 is measured by sensing the back E.M.F. of the motor. Sampling the speed is accomplished by in the following sequence that is executed on request during the window motion:

1) turn off the 4 Mosfets 21, 22, 23, 24 of the H bridge;
2) wait for 2 milliseconds to demagnetize the motor;
3) turn on a Low Side Mosfet 23 or 24 to connect the motor to Ground;
4) sample the Back EMF on the open terminal M1 or M2 of the motor;
5) turn off the Low Side Mosfet 23, 24 and repower the motor.

The whole sequence lasts no longer than 3 ms and the H-Bridge is then switched back to its initial state. The sampled value is then used in the Anti-Pinch Algorithm as a speed feedback.

Torque & Speed Profiles

Figure 4:
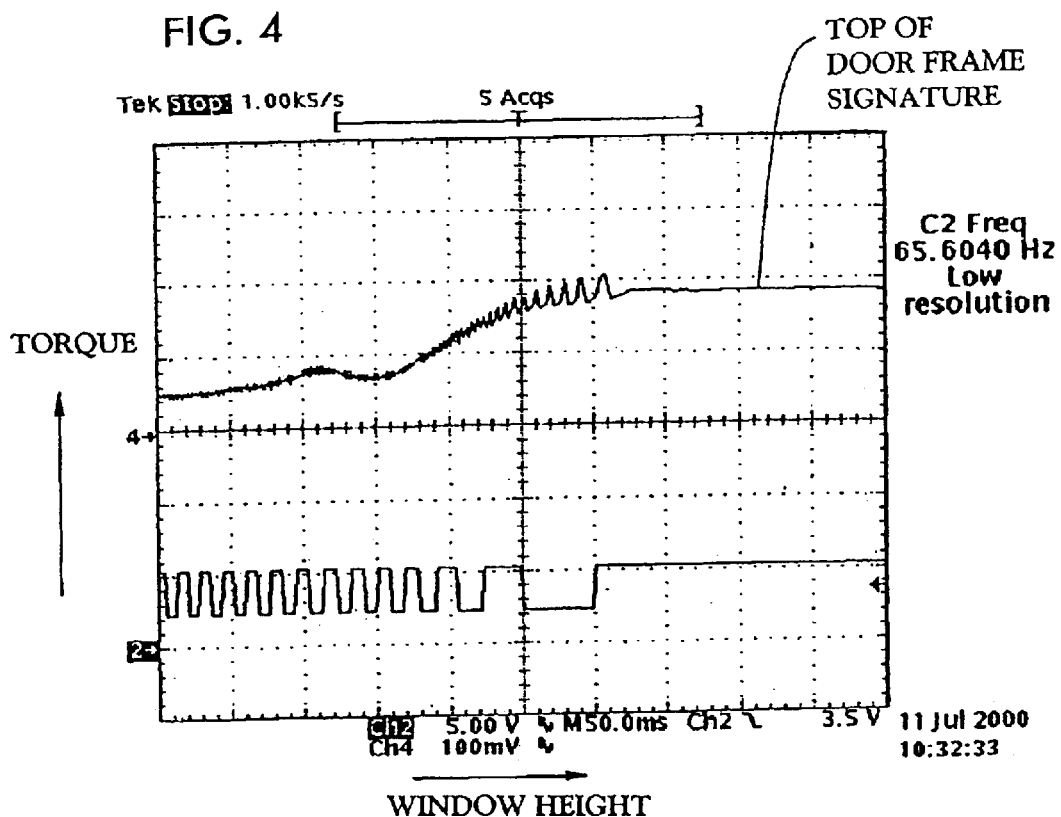
FIG. 4 shows the motor torque profile as a function of window height (signature) with the window closing at the top of the door.
Figure 5:
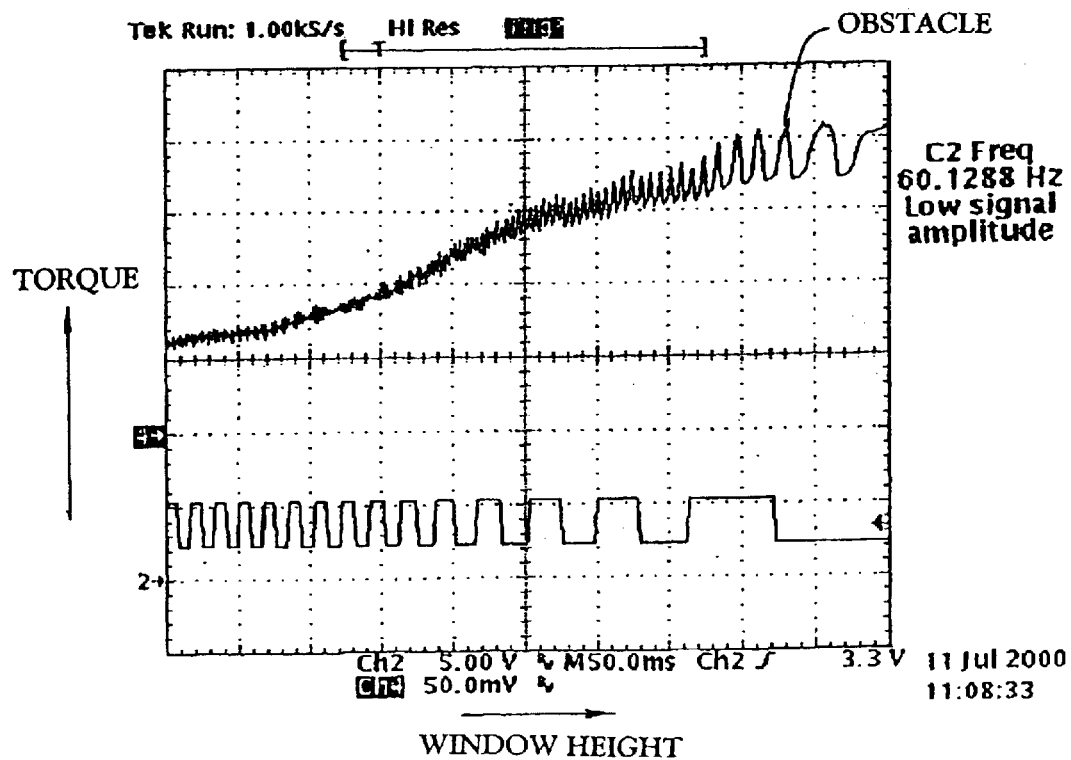
FIG. 5 shows the motor torque profile of FIG. 4 when modified by a body part obstacle at the door top.

The basic aim is to identify the "top of the door" characteristic with a sufficient definition in order to not confuse it with any "flesh obstacle". The characterization is done by looking at the "Torque vs. Time" and the "Speed vs. Time" curves when the window approaches the top of the door. Monitoring the "Torque vs. Time" curve could cover 80% of the "anti-pinch" function but the "Speed vs. Time" profile helps in identifying some of the most difficult cases like a thin finger or a child's neck or head. The waveforms of FIGS. 4 and 5 show the torque profiles for the top of the door and for a hand pinched in the window respectively. The current of the motor is monitored and represents the torque.

The small plateau on the curve of FIG. 4 is the "signature" of the top of the door. In this example, it corresponds to the rubber seal that the window has to go through before being blocked. The slope and the shape of the current and the slope and the shape of the motor speed (not represented here) clearly characterize the door top compared to the "flesh" profiles (body obstacles) as shown in FIG. 5. If needed, the door top "signature" is easily improved by adding a very small spring (laminated or regular) directly inside the rubber window seal. By doing so, the plateau is higher and more exaggerated (due to added torque needed to compress the spring) and the "signature" becomes really typical even with ageing or temperature effects. The spring may be added either in the door or embedded in the mechanical system.

Figure 6:
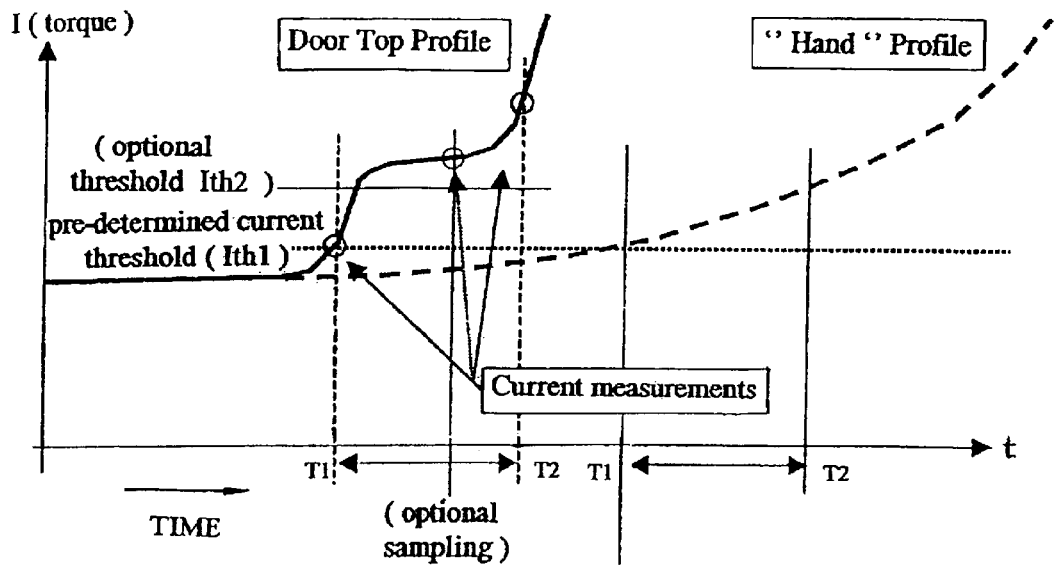
FIG. 6 shows the torque (motor current) profiles for the system of the present invention for the cases of no obstacle and an obstacle in the form of a person's hand as a function of time.

FIG. 6 shows the torque profile monitored over a given sample time. If, during the sample time, the window reaches the top of the door frame, the torque (as measured by motor current), will have the shape shown in solid lines, and if an obstacle is engaged, it will have the shape shown in dotted lines. The current (torque) will be constant, and below a preset threshold, if neither the door top or obstacle is reached in the interval.

Figure 7:
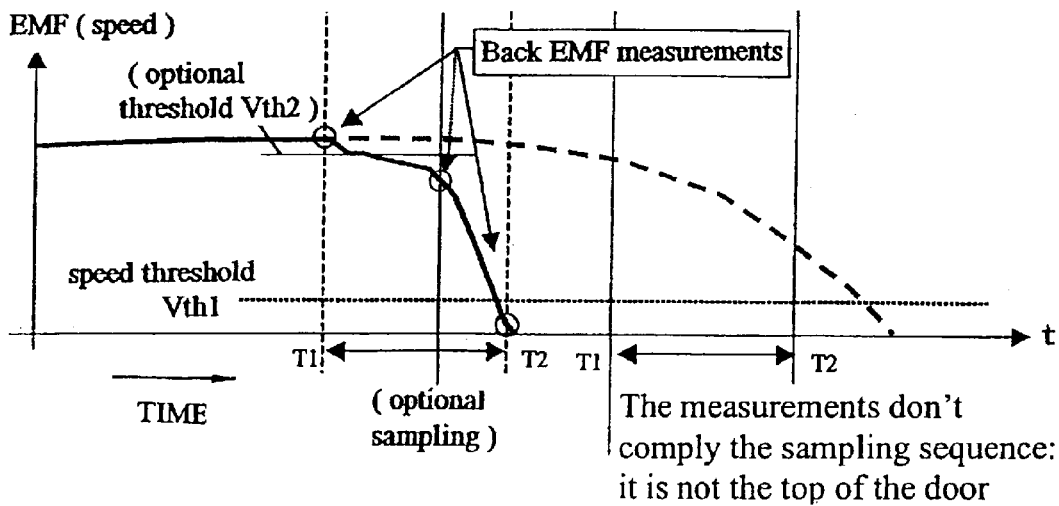
FIG. 7 shows the EMF (motor speed) profile as a function of time for the conditions of FIG. 6.

FIG. 7, shows the motor shaft speed (as measured by the motor back EMF) during the interval. The motor speed drops to zero if the door top is reached, as shown in solid lines in FIG. 7; or reduces more gradually as shown in dotted lines if an obstacle is encountered.

The torque and speed profiles of FIGS. 6 and 7 respectively need not to be monitored all the time. Selecting two or three samples in the "typical zone" is enough to identify the door top. One of the algorithms is presented hereafter. It monitors the motor current during the window motion and starts a two sample acquisition sequence when the current exceeds a pre-determined threshold. The sequence is composed of two (optionally three) series of the current and speed samples. They are compared to a current threshold and a speed threshold (optionally two current and speed thresholds).

An example of a three series sequence is described in the flow chart of FIG. 8. The thresholds and temporization have to be adapted depending on the mechanical system and the motor characteristics. The sequence architecture itself remains identical whatever the window type.

The flow chart of FIG. 8 shows how the "door top signature" of FIG. 4 is identified thanks to a 3 point characterization. The anti-pinch detection can be summarized with reference to FIG. 8 as follows:

If the torque exceeds the nominal value for more than 50 ms and if it corresponds to the door top signature then the window is stopped.

If the torque exceeds the nominal value for more than 50 ms and doesn't show a door top profile, then the motor power is reversed and the window goes down until the second current threshold definitely stops it at the bottom position.

More specifically, and as seen in FIGS. 6, 7 and 8, the circuit of FIG. 1 defines two motor current threshold values $I_{th1}$ and $I_{th2}$ (which are motor torque threshold values); and two EMF threshold values $V_{th1}$ and $V_{th2}$, corresponding to motor speed threshold values.

In a first sample, the motor torque is measured in 50 ms intervals until the motor current exceeds $I_{th1}$) which can be caused either because of the beginning of the door top profile or hand profile in FIG. 6.

A comparison is next made of the motor current to threshold $I_{th2}$. If $I_{th2}$ has not been reached, then the "hand profile" and not the door top profile is the cause of the increase in motor torque, and the motor power is reversed. However, if the current exceeds $I_{th2}$, the back EMF (or shaft speed) is acquired (in a second phase) to determine if the EMF is between $V_{th1}$ and $V_{th2}$. If it is not this indicates, in FIG. 7, a "soft" obstacle, and the motor is reversed. If the motor speed is between $V_{th1}$ and $V_{th2}$, the motor may be stopped, or subsequent measurements may be made in a third phase to either stop or reverse the motor as shown in FIG. 8.

Temperature Effects

The door signature is not adversely affected by temperature variations. Temperature effects can be virtually eliminated when the signature is enhanced by the use of a spring. At low temperature, the torque level during motion is higher and may reach the obstacle detection threshold. The corresponding current threshold ($I_{th1}$) is then pre-programmed depending on the outside temperature. This can be done by a temperature sensor directly interfaced with the I.C. It is also possible to measure the average current of the motor during the first downward going motion and to predict the proper "anti-pinch" current level when the window will be going upward.

The H bridge I.C. of FIG. 1 may use a 20 kHz PWM oscillator. Speed or torque could be momentarily controlled as desired and help in the "anti-pinch" function (for example, a reduction of the speed when the current threshold is reached to help to differentiate the profiles) and to simplify the "anti-pinch detection.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. An anti-pinch window system for a power window having a fully closed position, the system comprising:
   a drive circuit capable of supplying a drive current;
   a reversible d-c motor operably coupled to the drive circuit electrically, the motor being mechanically coupled to the power window such that the motor is capable of raising and lowering the window;
   a reference circuit operably coupled to the drive circuit such that the reference circuit is capable of detecting, without an external sensor, both a measure of the drive current and a measure of a back EMF of the motor, distinguishing normal operation of the motor during raising of the window to the fully closed position from interruption of the raising of the window by an unsafe condition based on both the measure of the drive current and the measure of the back EMF of the motor, wherein the occurrence of the unsafe condition is distinguished; and
   a control circuit operably coupled to the reference circuit and the drive circuit, such that the control circuit controls the drive circuit and automatically reverses the direction of the motor in response to the occurrence of the unsafe condition.

2. The system of claim 1, wherein the drive circuit and control circuit are integrated in an H bridge control circuit.

3. The system of claim 1, wherein the drive circuit and control circuit are integrated into a single IC control chip.

4. The system of claim 3, wherein the drive circuit, the control circuit and the reference circuit are mounted on a common circuit board.

5. The system of claim 1, further comprising a spring wherein the power window compresses the spring when the window is in the fully closed position thereby affecting the measure of the drive current and the measure of the back EMF from the motor.

6. The system of claim 5, wherein the spring is a laminated spring directly inside the rubber window seal.

7. The system of claim 1, wherein the reference circuit comprises:
   a first reference circuit capable of monitoring the measure of the drive current and comparing the measure of the drive current to a first drive current threshold value and a second drive current threshold value that is greater than the first drive current threshold value, during raising of the window, such that if the drive current suddenly exceeds the first drive current threshold value but not the second drive current threshold value during raising of the window, then the control circuit reverses the motor;
   a second reference circuit operably coupled to the first reference circuit such that the second reference circuit is capable of sampling a measure of a back EMF of the motor, after the measure of the drive current is greater than both the first drive current threshold value and the second drive current threshold value; and
   a comparator circuit that is operably coupled to the second reference circuit such that the measure of the back EMF is compared to a first back EMF threshold value and a second back EMF threshold value greater than the first back EMF threshold value, and the comparator is operably coupled to the control circuit such that the control circuit reverses the direction of the motor if the first back EMF threshold value is not less than the measure of the back EMF of the motor or the measure of the back EMF of the motor is not less than the second back EMF threshold voltage.

8. The system of claim 7, wherein the first reference circuit, the second reference circuit, the comparator circuit and the control circuit are coupled such that, if the first back EMF threshold value is less than the measure of the back EMF and the measure of the back EMF is less than the second back EMF threshold value, then the measure of the drive current is compared to the second drive current threshold again after a delay period, and the control circuit reverses the direction of the motor, if the measure of the drive current is not greater than the second drive current threshold value.

9. The system of claim 8, wherein the first reference circuit, the second reference circuit, the comparator circuit and the control circuit are coupled such that, if the measure of the drive current as measured in claim 8 is greater than the second drive current threshold, then the second reference circuit again samples the measure of the back EMF and the comparator circuit compares the measure of the back EMF to the first back EMF threshold value and the control circuit reverses the direction of the motor, if the measure of the back EMF is not less than the first back EMF threshold voltage, otherwise the control circuit stops the motor.

10. An antipinch window system for a power window having a filly closed position and a drive motor for raising and lowering the window, the system comprising:
    a means for detecting, without an external sensor, a measure of a drive current and a measure of a back EMF of the drive motor;
    a means for distinguishing normal operation of the motor during raising of the window to the filly closed position from an unsafe interruption of the raising of the window based on the measure of the drive current and the measure of the back EMF supplied by the means for detecting; and
    a means for automatically reversing the drive motor when the unsafe interruption occurs as determined by the means for distinguishing.

11. A process of controlling a drive motor for automatically reversing the direction of a power window in response to an unsafe condition caused by an obstruction during raising of the window, the process of controlling the drive motor, comprising:
    measuring the torque on the motor using a measure of the current of the drive motor without any external sensor;
    monitoring the measure of the torque during raising of the window;
    detecting either an occurrence of the unsafe condition or an approach of the window to a fully closed position;
    distinguishing the occurrence of the unsafe condition from the approach of the window to the fully closed position based on both the measure of the torque and a measure of a back EMF of the drive motor, without an external sensor; and
    reversing the direction of the drive motor automatically in response to the occurrence of the unsafe condition.

12. The process of claim 11, wherein the step of detecting uses only the measure of the torque, and the step of distinguishing uses both the measure of the torque and the measure of the back EMF of the drive motor.

13. The process of claim 12, wherein the step of distinguishing comprises, in sequence:
    comparing the measure of the torque obtained during the step of detecting to a first torque threshold value and a second torque threshold value that is greater than the first torque threshold value, such that the occurrence of the unsafe condition is distinguished when the measure of the torque is greater than the first torque threshold value and not greater than the second torque threshold value;

acquiring a first measure of the back EMF, only if the measure of the torque obtained during the step of detecting is greater than the second torque threshold value; and comparing the first measure of the back EMF to a first back EMF threshold value and a second back EMF threshold value, such that the occurrence of the unsafe condition is distinguished when the first back EMF threshold value is not less than the first measure of the back EMF or the first measure of the back EMF is not less than the second back EMF threshold.

14. The process of claim 13, wherein the step of distinguishing further comprises:

waiting for a period of time, if first back EMF threshold value is less than the first measure of the back EMF and the first measure of the back EMF is less than the second back EMF threshold;

then, determining a new measure of the torque;

comparing the new measure of the torque and the second torque threshold value, such that the occurrence of the unsafe condition is distinguished when the measure of the torque is not greater than the second torque threshold value;

acquiring a second measure of the back EMF, if the new measure of the torque is greater than the second torque threshold; and comparing the second measure of the back EMF to the first back EMF threshold value, such that the occurrence of the unsafe condition is distinguished when the second measure of the back EMF is not less than the first back EMF threshold value.

15. The process of claim 14, further comprising:

stopping the drive motor, after the step of comparing the second measure of the back EMF, if the second measure of the back EMF is less than the first back EMF threshold value.

16. The process of claim 13, wherein the first torque threshold value is adjusted for changes in the temperature or for changes in the average drive current during a first lowering of the window.

17. The process of claim 11, further comprising, after the first step of detecting, a step of reducing the speed of the motor.

* * * * *